United States Patent
Çubukçu

(10) Patent No.: US 11,570,639 B2
(45) Date of Patent: Jan. 31, 2023

(54) METHOD, DEVICE AND COMPUTER PROGRAM FOR OBTAINING A MEASURE OF THE TEMPERATURE OF A WIRELESS ADAPTER

(71) Applicant: Vestel Elektronik Sanayi ve Ticaret A.Ş., Manisa (TR)

(72) Inventor: Baran Çubukçu, Manisa (TR)

(73) Assignee: VESTEL ELEKTRONIK SANAYI VE TICARET A.S., Manisa (TR)

( * ) Notice: Subject to any disclaimer, the term of this patent is extended or adjusted under 35 U.S.C. 154(b) by 1045 days.

(21) Appl. No.: 16/255,501

(22) Filed: Jan. 23, 2019

(65) Prior Publication Data

US 2019/0230535 A1    Jul. 25, 2019

(30) Foreign Application Priority Data

Jan. 25, 2018 (EP) ...................... 8153510

(51) Int. Cl.
| | |
|---|---|
| H04W 24/08 | (2009.01) |
| G01K 1/20 | (2006.01) |
| G01K 3/00 | (2006.01) |
| G01K 3/10 | (2006.01) |
| G01K 1/024 | (2021.01) |
| G01K 7/42 | (2006.01) |
| H04Q 9/00 | (2006.01) |

(52) U.S. Cl.
CPC ............ *H04W 24/08* (2013.01); *G01K 1/024* (2013.01); *G01K 1/20* (2013.01); *G01K 3/005* (2013.01); *G01K 3/10* (2013.01); *G01K 7/42* (2013.01); *G01K 7/425* (2013.01); *H04Q 9/00* (2013.01); *H04Q 2209/40* (2013.01)

(58) Field of Classification Search
CPC ......... H04W 24/08; G01K 1/024; G01K 1/20; G01K 3/005; G01K 3/10; G01K 7/42; G01K 7/425; H04Q 9/00; H04Q 2209/40
See application file for complete search history.

(56) References Cited

U.S. PATENT DOCUMENTS

| | | | | |
|---|---|---|---|---|
| 6,059,192 A | * | 5/2000 | Zosimadis | E03C 1/057 236/12.12 |
| 7,408,132 B2 | * | 8/2008 | Wambsganss | H02H 5/042 219/202 |
| 7,846,397 B2 | * | 12/2010 | Gregg | G01K 1/024 374/E1.001 |
| 8,265,588 B2 | | 9/2012 | Well et al. | |
| 8,452,323 B2 | | 5/2013 | Anderson et al. | |
| 9,674,976 B2 | * | 6/2017 | Strei | H05K 5/064 |
| 2007/0002837 A1 | | 1/2007 | Tan | |
| 2008/0007192 A1 | | 1/2008 | Williams et al. | |
| 2010/0091691 A1 | | 4/2010 | Dorsey et al. | |
| 2014/0225659 A1 | | 8/2014 | Bhangu et al. | |

\* cited by examiner

*Primary Examiner* — Elias Desta
(74) *Attorney, Agent, or Firm* — J. Miguel Hernandez; James R. Gourley; Carstens, Alien & Gourley, LLP

(57) ABSTRACT

A wireless adapter (10) is removably connected to an electronic device (30) to provide wireless connectivity for the electronic device (30). One or more operating parameters of the wireless adapter (10) are measured whilst the wireless adapter (10) is in use. A measure of the temperature of the wireless adapter (10) is obtained based on the measured one or more operating parameters.

15 Claims, 1 Drawing Sheet

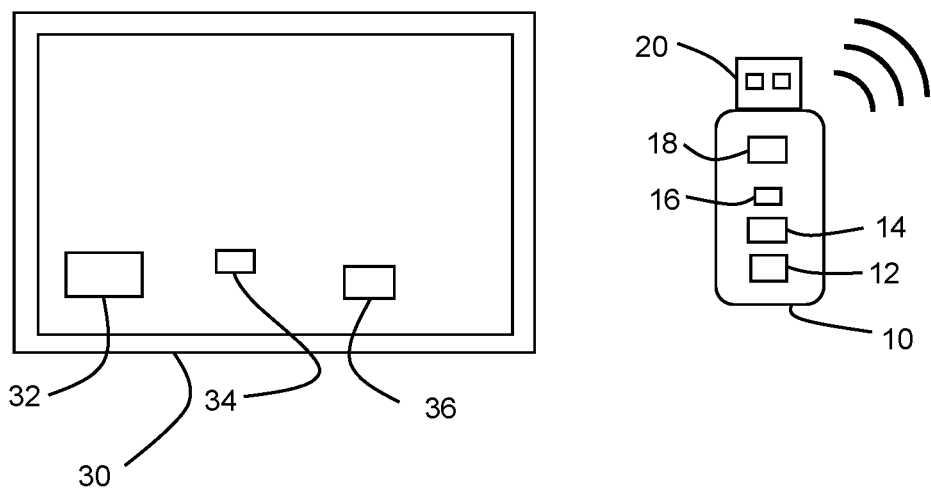

METHOD, DEVICE AND COMPUTER PROGRAM FOR OBTAINING A MEASURE OF THE TEMPERATURE OF A WIRELESS ADAPTER

CROSS-REFERENCE TO RELATED APPLICATIONS

This application claims the benefit under 35 U.S.C. § 119(a) and 37 CFR § 1.55 to European patent application 18153510.5 filed Jan. 25, 2018, the entire content of which is incorporated herein by reference.

TECHNICAL FIELD

The present disclosure relates to a method, device and computer program for obtaining a measure of the temperature of a wireless adapter.

BACKGROUND

Wireless adapters (often also called "dongles") are self-contained devices which are used to provide wireless connectivity for devices, in particular for electronic devices that may not have the hardware necessary for wireless connections. The wireless adapter is typically plugged into a port of the electronic device, using for example a USB (Universal Serial Bus) connection. A known problem with wireless adapters is that they can become very hot in use.

SUMMARY

According to a first aspect disclosed herein, there is provided a method of obtaining a measure of the temperature of a wireless adapter, which is removably connected to an electronic device to provide wireless connectivity for the electronic device, the method comprising:
measuring one or more operating parameters of the wireless adapter whilst the wireless adapter is in use; and
obtaining a measure of the temperature of the wireless adapter based on the measured one or more operating parameters.

This enables the temperature of a wireless adapter to be monitored in use, so that for example a warning can be given that the wireless adapter may be hot to touch. It is not required that the wireless adapter be provided with a temperature sensor as such. This means that the method can be implemented in conjunction with existing wireless adapters.

It is to be noted that it is not necessary to literally measure the temperature of the wireless adapter (i.e. to provide an output like "50° C."). On the contrary, it is typically sufficient to obtain some measure of the temperature of the wireless adapter so that for example a warning can be given that the wireless adapter may be hot to touch.

The method may be carried out by for example the wireless adapter itself, by the electronic device to which the wireless adapter is connected in use, by some other "master" device, or by any combination of these.

In an example, the method comprises measuring plural operating parameters of the wireless adapter whilst the wireless adapter is in use, wherein the obtaining a measure of the temperature of the wireless adapter based on the measured operating parameters comprises summing the measures of the operating parameters.

In an example, the method comprises outputting a warning if the sum of the measures of the operating parameters exceeds a threshold.

The warning may be output only if a user is detected, by for example a proximity sensor, as being close to the wireless adapter. This may be of particular benefit in the case that the warning is an audio warning as the warning is only sounded when a risk of danger to a person is likely, and users are otherwise not troubled by audible warnings when there is no risk of a person touching a hot wireless adapter.

In an example, at least one of the one or more operating parameters is measured over a time interval.

The time interval may be a time interval up to the current time. This may therefore in effect be a rolling time interval such that the measure of the at least one of the one or more operating parameters is updated over time.

In an example, the one or more operating parameters includes the amount of data that has been wirelessly transmitted by the wireless adapter over a time interval.

In an example, the one or more operating parameters includes the transmit power used by the wireless adapter for wireless transmissions.

In an example, the one or more operating parameters includes the amount of data that has been wirelessly received by the wireless adapter over a time interval.

In an example, the one or more operating parameters includes the signal strength for wireless transmissions received by the wireless adapter.

In an example, the one or more operating parameters includes the time that the wireless adapter has been in active use.

"Active use" here includes for example when the wireless adapter is transmitting or receiving data or for example searching for a wireless network, etc. "Active use" here typically does not include when the wireless adapter is (at least relatively) inactive, and therefore not consuming much electrical power, such as when the wireless adapter is passive and not actively transmitting or receiving data or other signals, searching for a network, etc.

In an example, the obtaining a measure of the temperature of the wireless adapter is additionally based on the ambient temperature.

According to a second aspect disclosed herein, there is provided a device for obtaining a measure of the temperature of a wireless adapter, which is for being removably connected to an electronic device to provide wireless connectivity for the electronic device, the device being arranged to measure one or more operating parameters of the wireless adapter whilst the wireless adapter is in use and to obtain a measure of the temperature of the wireless adapter based on the measured one or more operating parameters.

The device may be incorporated in or be the wireless adapter itself, or may be incorporated in or be the electronic device to which the wireless adapter is connected in use.

In an example, the device is arranged to measure plural operating parameters of the wireless adapter whilst the wireless adapter is in use, and being arranged to obtain a measure of the temperature of the wireless adapter based on the measured operating parameters by summing the measures of the operating parameters.

In an example, the device is arranged such that at least one of the one or more operating parameters is measured over a time interval.

In an example, the device is arranged such that the one or more operating parameters includes one or more of (i) the amount of data that has been wirelessly transmitted by the wireless adapter over a time interval, (ii) the transmit power used by the wireless adapter for wireless transmissions, (iii) the amount of data that has been wirelessly received by the wireless adapter over a time interval, (iv) the signal strength for wireless transmissions received by the wireless adapter, and (v) the time that the wireless adapter has been in active use; and optionally the obtaining a measure of the temperature of the wireless adapter is additionally based on the ambient temperature.

There may also be provided a computer program comprising instructions such that when the computer program is executed on a device, the computing device is arranged to carry out a method as described above.

BRIEF DESCRIPTION OF THE DRAWINGS

To assist understanding of the present disclosure and to show how embodiments may be put into effect, reference is made by way of example to the accompanying drawing in which:

FIG. 1 shows schematically an example of a wireless adapter and an electronic device.

DETAILED DESCRIPTION

As mentioned, wireless adapters (often also called "dongles") are self-contained devices which are used to provide wireless connectivity for devices, in particular for electronic devices that may not have the hardware necessary for wireless connections. The wireless adapter is typically plugged into a port of the electronic device, using for example a USB (Universal Serial Bus) or other connection. The wireless connection may provide for connection to the Internet, typically via a wireless router or the like, using for example WiFi or the like to connect with the router. Alternatively or additionally, a wireless adapter may provide a cellular connection for the electronic device, using for example 3G or 4G or the like for the cellular wireless services. The wireless connection may alternatively or additionally use some other wireless technology, such as for example Bluetooth.

FIG. 1 shows schematically an example of a wireless adapter 10 and an electronic device 30.

The electronic device 30 may in general be any electronic device that needs wireless connectivity, including for example a consumer electronic device. Some specific examples include a media device such as a television set, a display screen or panel, a set top box, a PVR (personal video recorder), a DVD player, a Blu Ray player, a personal computing device such as a laptop or desktop or tablet computer, a video game console, a printer, etc., or an appliance such as a "white goods" item such as a washing machine, a tumble dryer, a combined washing machine and tumble dryer, a dishwasher, a refrigeration apparatus such as a fridge or freezer or combined fridge-freezer, etc. (such appliances increasingly requiring an Internet connection for the so-called "Internet of Things"). The electronic device 30 has a processor 32, memory 34, data storage 36, etc. In this example, the electronic device 30 is a television set or a display panel 30.

The wireless adapter 10 in this example is removably connectable to the electronic device 30 via a plug 20 on the wireless adapter 10 which can be connected to a corresponding socket (not shown) on the electronic device 30. In this example, the connection is a USB connection, though other connection technologies may be used. The wireless adapter 10 has a processor 12, memory 14, data storage 16, etc. The processor 12 controls the sending and receiving of signals by the wireless adapter 10 to and from the electronic device 30 via the plug 20. The processor 12 also controls the wireless sending and receiving of signals by the wireless adapter 10 via a radio interface 18. The wireless adapter 10 has an antenna (not shown) for sending and receiving wireless signals. The antenna may be internal or external, and there may be both internal and external antennas in some examples.

A known problem with wireless adapters is that they can become very hot in use. Wireless adapters can become so hot that they are uncomfortable to touch, and can even cause damage to human skin. For example, there are reports of the exterior of wireless adapters reaching temperatures in excess of 50° C. or 60° C. and even up to 70° C. to 80° C.

This can be a problem if a user wishes to remove the wireless adapter from an electronic device. This problem is exacerbated if for example the wireless adapter is in a relatively inaccessible place. This can occur in devices, including for example television sets and display panels, where the socket for the wireless adapter may be at the rear of the device, particularly as the device, such as a television set or display panel, may be mounted on a wall: the user often cannot even see the wireless adapter and has to locate it by "feel". Also, many television sets or display panels are used in public places, such as shopping centres, airports, railway stations, public forums, etc., such that members of the public could access the device and touch a wireless adapter by accident or without realising that it might be hot. In any event, excessive heating of a wireless adapter can cause the wireless adapter to malfunction or even be damaged, and at least can cause a drop off in data transfer rates.

Known wireless adapters do not provide for measuring the temperature of the wireless adapter. Whilst in principle it is possible to add some kind of temperature sensor to the wireless adapter, this is impractical or even impossible with existing wireless adapters that are already in use.

Examples described herein monitor and measure one or more operating parameters of the wireless adapter 10 whilst the wireless adapter 10 is in use. A measure of the temperature of the wireless adapter 10 is obtained based on the measured one or more operating parameters. This can be carried out without requiring the wireless adapter 10 to have a temperature sensor as such, and therefore can be used with existing wireless adapters 10 that are already in use and can also be used in conjunction with new wireless adapters 10 without requiring those new wireless adapters 10 to be manufactured to include a temperature sensor.

This can be carried out by for example the wireless adapter 10 itself, by the electronic device 30 to which the wireless adapter 10 is connected in use, by some other "master" device (which may for example be an intermediary device, such as a computer, which receives signals via the wireless adapter 10 and which sends display signals to a television set 30 or a display panel or the like), or by any combination of these. In the case that this is carried out by the wireless adapter 10 itself or by the wireless adapter 10 in conjunction with some other device, such as the device 30 to which the wireless adapter 10 is connected, the required functionality of the wireless adapter 10 may be implemented by for example firmware on the wireless adapter 10. Indeed, this can be implemented in existing wireless adapters 10, which may be in use "in the field", by way of a firmware update.

It is to be noted that it is not necessary to literally measure the temperature of the wireless adapter 10 (i.e. to provide an output like "50° C."). On the contrary, it is typically sufficient to obtain some measure of the temperature of the wireless adapter 10, without necessarily obtain a precise estimate of the actual temperature. This is sufficient to enable a warning to be given to users that the wireless adapter 10 may be hot to touch.

Some specific examples of operating parameters that may be measured will be discussed below. Specific examples described herein may use one or more of these operating parameters. Such operating parameters are those that have been found to have the greatest effect on the temperature of the wireless adapter 10 in use. There may be additional operating parameters that may be measured. Some specific examples of how to obtain a measure of the temperature of the wireless adapter 10 based on the measured one or more operating parameters will be given below.

At least some of the operating parameters may be measured over a time interval. The time interval may be predetermined. In some examples, the time interval may be adjustable, by for example a user based on experience with the method in use and the accuracy of the measure of the temperature of the wireless adapter that is obtained. This will become clearer from the following.

One operating parameter which may be measured is the amount of data that has been wirelessly transmitted by the wireless adapter 10 over a time interval. This is likely to be of most relevance when the wireless adapter 10 is being used to allow a user to upload large data files to some remote server or the like, and is not being used to download large data files for example. In use, when the wireless adapter 10 is wirelessly transmitting data, the power consumption of the wireless is relatively high (compared for example to when the wireless adapter 10 is not wirelessly transmitting data) causing a greater amount of heat to be generated by the wireless adapter 10. As a result, the temperature of the wireless adapter 10 tends to rise when the wireless adapter is wirelessly transmitting data and, on average, the greater the amount of data that is wirelessly transmitted, the greater the rise in temperature. The time interval here may be a time interval up to the current time. This may therefore in effect be a rolling time interval such that the measure of the amount of data that has been wirelessly transmitted by the wireless adapter 10 is the amount of data that has been transmitted in the immediately preceding time interval. To illustrate this, the time interval may be for example, and without limitation, the last 10 seconds, the last 30 seconds, the last minute, etc., etc.

Another operating parameter which may be measured is the transmit power used by the wireless adapter 10 for wireless transmissions. This may be the transmit power or an average of the transmit power used over a time interval. In general, if a higher transmit power is being used, this means that the wireless adapter 10 is consuming more power in an amplifier circuit and the like, such that more heat is generated in use. The time interval here may again be a time interval up to the current time. This may therefore in effect be a rolling time interval. The time interval may be the same as or different from time intervals used for other operating parameters.

Another operating parameter which may be measured is the amount of data that has been wirelessly received by the wireless adapter 10 over a time interval. Similarly to the case for the amount of data that has been wirelessly transmitted by the wireless adapter 10, when the wireless adapter 10 is wirelessly receiving data, the power consumption of the wireless is relatively high (compared for example to when the wireless adapter 10 is not receiving data). The wireless adapter 10 may carry out some processing of data that is wirelessly received before passing that data on to some device to which the wireless adapter 10 is connected. This may occur when for example the device is a such as a television set 30 or some other similar media device, and the wireless adapter 10 is being used to receive video and audio and possibly other data for the media device. Such processing inevitably causes heat to be generated by the wireless adapter 10. In any event, the temperature of the wireless adapter 10 tends to rise when the wireless adapter is wirelessly receiving data and, on average, the greater the amount of data that is received, the greater the rise in temperature. The time interval here may again be a time interval up to the current time. This may therefore in effect be a rolling time interval such that the measure of the amount of data that has been wirelessly received by the wireless adapter 10 is the amount of data that has been received in the immediately preceding time interval. The time interval may be the same as or different from time intervals used for other operating parameters.

Another operating parameter which may be measured is the signal strength for wireless transmissions received by the wireless adapter 10. In general, a lower signal strength can cause the wireless adapter to consume more electrical power as the wireless adapter 10 has to carry out increased processing, resulting in greater heating of the wireless adapter. This can occur particularly when the wireless adapter 10 is receiving transmissions via a cellular network but also when the wireless adapter 10 is receiving transmissions via WiFi or other wireless technologies. As a particular example, some wireless adapters operate in low power mode as a power saving function when the signal strength is high, but switch off the power saving mode when the signal strength is low. The signal strength may be the signal strength or an average signal strength over a time interval. The time interval here may again be a time interval up to the current time. This may therefore in effect be a rolling time interval. The time interval may be the same as or different from time intervals used for other operating parameters.

Another operating parameter which may be measured is the amount of time (up to the current time) that the wireless adapter 10 has been in active use. "Active use" here includes for example when the wireless adapter 10 is transmitting or receiving data or for example searching for a wireless network, etc. "Active use" here typically does not include when the wireless adapter 10 is (at least relatively) inactive, and therefore not consuming much electrical power, such as when the wireless adapter 10 is passive and not actively transmitting or receiving data or other signals, searching for a network, etc.

Another parameter which may be measured is the ambient temperature, that is, the temperature in the immediate vicinity of the wireless adapter 10. In general, if the ambient temperature is higher, the wireless adapter 10 is more prone to overheating because the rate of cooling by loss of heat to the environment is lower. Measuring the ambient temperature may be possible and particularly convenient in the case that there is already some temperature sensor available that measures the ambient temperature. This may be for example a temperature sensor that is present in the electronic device 30 to which the wireless adapter 10 is connected in use. Alternatively or additionally, there may be a temperature sensor that already provides a measure of ambient temperature in the environment in which the electronic device 30 and the wireless adapter 10 are being used. This is for example common in many public places, including for example shopping centres, airports, railway stations, public forums, etc., where a display of the ambient temperature may be provided to the public for information purposes (often in conjunction with current weather conditions, current time of day, etc.).

Other examples of operating parameters which may be measured are possible.

Having obtained a measure of one or more operating parameters of the wireless adapter 10, a measure of the temperature of the wireless adapter 10 is then obtained based on the measured one or more operating parameters. A number of options for this are possible, which can vary in complexity. However, given that a precise measure of the temperature of the wireless adapter 10 is not normally required, a simple technique may be used, which is not demanding of processor or data storage requirements. This facilitates implementation of the method by for example the wireless adapter 10 itself, though the method may nevertheless be implemented by or in conjunction with some other device, such as the electronic device 30 to which the wireless adapter is connected, as discussed above.

In one example, when plural operating parameters are measured, the measure of the temperature of the wireless adapter 10 may be obtained by summing the measures of the operating parameters. If the sum of the operating measures exceeds a threshold, then it is determined that the wireless adapter 10 may be hot. The threshold may be a preset that is set by for example a manufacturer of the wireless adapter 10. The threshold may alternatively or additionally be set or be adjustable by a user, for example based on experience of using the wireless adapter 10.

To sum the measures of plural operating parameters, the measures of the various operating parameters may each be multiplied by a coefficient according to the units used for the measure. Some examples are discussed below. These coefficients may be preset by for example a manufacturer of the wireless adapter 10. The values may alternatively or additionally be set or be adjustable by a user, for example based on experience of using the wireless adapter 10. The coefficients that are used per unit measure may be selected so as to give an appropriate weighting to the various measured operating parameters according to their effect on heating of the wireless adapter 10.

As a first example, each Mb (megabit) of data that is wirelessly transmitted may count as "x" units. Accordingly, if it is measured that 250 Mb of data has been wirelessly transmitted in the relevant time interval, this counts as 250× units.

As another example, each Mb (megabit) of data that is wirelessly received may count as "x" units. Accordingly, if it is measured that 10 Mb of data has been wirelessly received in the relevant time interval, this counts as 10× units.

As another example, each mW (milliwatt) of transmit power may count as "x" units. Accordingly, if it is measured that the transmit power over the relevant time interval was 10 mW, this counts as 10× units.

As another example, if the signal strength over the relevant time period was 5/5 (which typically implies low power consumption, as discussed above), this may count as x units for each second of active use, whereas if the if the signal strength over the relevant time period was 1/5 (which typically implies high power consumption, as discussed above), this may count as 5× units for each second of active use. This reflects the inverse relationship between signal strength and power consumption.

As another example, each second that the wireless adapter 10 has been in (active) use may count as "x" units.

As another example, the ambient temperature may be allocated units that increase as the ambient temperature increases. This may be in bands of temperature. For example, an ambient temperature in the range 20-24° C. may count as 10× units for the relevant time interval, an ambient temperature in the range 25-29° C. may count as 15× units for the relevant time interval, an ambient temperature in the range 30-34° C. may count as 20× units for the relevant time interval, etc.

To illustrate this by way of specific example and without limitation, assume that the operating parameters that are monitored and measured are the amount of data that has been wirelessly received, the duration of active use and the signal strength. Assume that the wireless adapter 10 has wirelessly received 60 Mb of data over 60 seconds of active use with 3/5 signal strength. The data consumption of 60 Mb will count as 60× units; the active use will count as 60× units; and the signal strength will count as 3*60×=180× units. Summing these will give a total of 300× units. This may be the threshold for determining that the wireless adapter 10 is hot. On the other hand, if the signal strength were greater, say 5/5, the contribution from the signal strength would be only 1*60× units, such that the sum would be under the threshold for determining that the wireless adapter 10 is hot. Likewise, if only 30 Mb of data was wirelessly received on the time period, again the sum would be under the threshold. As another example, if the wireless adapter 10 has wirelessly received 250 Mb of data over 60 seconds, then the sum of those two operating parameters alone would already be 310× units, which is already over the threshold regardless of other operating parameters.

Accordingly, in a relatively simple way, a measure of the temperature of the wireless adapter 10 can be obtained simply by "observing" usage of the wireless adapter 10 and optionally taking into account environmental factors such as ambient temperature. It is not required that the wireless adapter 10 have a temperature sensor as such.

If it is determined that the temperature of the wireless adapter 10 is (likely to be) high, a warning may be output for users. This can take a number of forms. For example, the wireless adapter 10 may send an instruction to the device, such as a television set 20, to which the wireless adapter 10 is connected for the device to display a visible warning message on a screen of the device. As another example, the wireless adapter 10 may have one or more warning lights, such as for example LEDs (light emitting diodes) which can be caused to illuminate so as to provide a warning. As another example, the wireless adapter 10 may cause an audible warning to be emitted, by for example the device to which the wireless adapter 10 is connected or by some sounder, such as a piezoelectric device, etc., of the wireless adapter 10 itself.

As an option, an indication may be provided for users when it is determined that the wireless adapter 10 is cool enough to be touched and so can be removed. The indication may be visual and/or audible, and may be provided along the lines as described above for the warning that the wireless adapter 10 is hot. This may be based on the sum of the measure of the operating parameters mentioned above, taking into account an expected rate of cooling of the wireless adapter 10. For example and continuing the example above, assume that the sum of the measure of the operating parameters is 300× units (i.e. the wireless adapter 10 is hot). Assume further that it is determined, for example by the manufacturer or by a user, that for safety and comfort a threshold of 100× units is preferred. This means that the wireless adapter 10 needs to lose 200× units (in order to reach 100×). Further, assume that a rate of cooling of the wireless adapter 10 is 5× for each second when the wireless adapter 10 is not in active use. This means that 200×/5×=40 seconds will be needed for the wireless adapter 10 to be cool enough for comfortable human touch. Accordingly, in this example an indication may be provided for users that the wireless adapter 10 is cool enough to be touched are 40 seconds has elapsed since the wireless adapter 10 was last actively used.

As another option, the wireless adapter 10 and/or the device to which the wireless adapter 10 is connected may have a proximity sensor which is arranged to determine if a person is near the wireless adapter 10. In such a case, the warning, whether audible and/or visual, may only be output if a person is actually close to the wireless adapter 10 and therefore possibly or even likely to touch the wireless adapter 10. This can avoid warnings being output if there is no risk of someone touching the wireless adapter 10. This is of particular advantage if the device, such as television set or other display device 30, and the wireless adapter 10 are being used in a public area as it will avoid alerting or worrying members of the public unnecessarily.

As another option, the thermal conductivity of the case or housing of the wireless adapter 10 may be taken into account and used as a factor in determining whether to provide a warning. This may be helpful because the temperature of the wireless adapter 10 that is measured or estimated is in effect in most examples an internal temperature (for example because of the operation of the processor 12), and so this provides an indication of how hot the exterior of the case or housing of the wireless adapter 10 is likely to be.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), graphics processing units (GPUs), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

Reference is made herein to data storage for storing data. This may be provided by a single device or by plural devices. Suitable devices include for example a hard disk and non-volatile semiconductor memory.

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. A method of obtaining a measure of the temperature of a wireless adapter, which is removably connected to an electronic device to provide wireless connectivity for the electronic device, the method comprising:
   measuring one or more operating parameters of the wireless adapter whilst the wireless adapter is in use; and
   obtaining a measure of the temperature of the wireless adapter based on the measured one or more operating parameters.

2. The method according to claim 1, comprising measuring plural operating parameters of the wireless adapter whilst the wireless adapter is in use, wherein the obtaining a measure of the temperature of the wireless adapter based on the measured operating parameters comprises summing the measures of the operating parameters.

3. The method according to claim 2, comprising outputting a warning if the sum of the measures of the operating parameters exceeds a threshold.

4. The method according to claim 1, wherein at least one of the one or more operating parameters is measured over a time interval.

5. The method according to claim 1, wherein the one or more operating parameters includes the amount of data that has been wirelessly transmitted by the wireless adapter over a time interval.

6. The method according to claim 1, wherein the one or more operating parameters includes the transmit power used by the wireless adapter for wireless transmissions.

7. The method according to claim 1, wherein the one or more operating parameters includes the amount of data that has been wirelessly received by the wireless adapter over a time interval.

8. The method according to claim 1, wherein the one or more operating parameters includes the signal strength for wireless transmissions received by the wireless adapter.

9. The method according to claim 1, wherein the one or more operating parameters includes the time that the wireless adapter has been in active use.

10. The method according to claim 1, wherein the obtaining a measure of the temperature of the wireless adapter is additionally based on the ambient temperature.

11. A non-transitory computer-readable storage medium storing a computer program, the computer program comprising instructions such that when the computer program is executed on a device, the computing device is arranged to carry out a method according to claim 1.

12. A device for obtaining a measure of the temperature of a wireless adapter, which is for being removably connected to an electronic device to provide wireless connectivity for the electronic device, the device being arranged to measure one or more operating parameters of the wireless adapter whilst the wireless adapter is in use and to obtain a measure of the temperature of the wireless adapter based on the measured one or more operating parameters.

13. The device according to claim 12, the device being arranged to measure plural operating parameters of the wireless adapter whilst the wireless adapter is in use, and being arranged to obtain a measure of the temperature of the wireless adapter based on the measured operating parameters by summing the measures of the operating parameters.

14. The device according to claim 12, arranged such that at least one of the one or more operating parameters is measured over a time interval.

15. The device according to claim 12, arranged such that the one or more operating parameters includes one or more of (i) the amount of data that has been wirelessly transmitted by the wireless adapter over a time interval, (ii) the transmit power used by the wireless adapter for wireless transmissions, (iii) the amount of data that has been wirelessly received by the wireless adapter over a time interval, (iv) the signal strength for wireless transmissions received by the wireless adapter, and (v) the time that the wireless adapter has been in active use; and optionally the obtaining a measure of the temperature of the wireless adapter is additionally based on the ambient temperature.

* * * * *